Patented Dec. 24, 1940

2,226,115

UNITED STATES PATENT OFFICE 2,226,115

NEW COMPOSITION OF MATTER AND METHOD OF MAKING SAME

Melvin De Groote, University City, Bernhard Keiser, Webster Groves, and Arthur F. Wirtel, Kirkwood, Mo., assignors, by mesne assignments, to Petrolite Corporation, Ltd., a corporation of Delaware No Drawing. Application May 12, 1939, Serial No. 273,220

13 Claims. (Cl. 260—404)

This invention relates to materials, compounds and compositions of matter of the kind that are used to treat emulsions of mineral oil and water, such as petroleum emulsions, for the purpose of separating the oil from the water.

One object of our invention is to provide a new material or composition of matter, that is particularly adapted for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide a method by which said new material or composition of matter can be manufactured readily and economically.

While the new material or composition of matter which constitutes our present invention is particularly adapted for use as a demulsifier in the resolution of petroleum emulsions, it may have uses in other arts that we have not yet investigated. As will be pointed out hereinafter, the method of making said new compound or composition of matter is such that it is accompanied by certain cogeneric materials. The previously indicated objects of our invention are specifically intended to apply not only to the principal product of reaction hereinafter described entirely or partially by chemical formulae, but also to the cogeneric mixture obtained in the manner and by the methods hereinafter described.

The new compound or composition of matter which constitutes one feature of our present invention consists of a certain kind of ester or condensation product or polymerization product, derived by reaction between a polybasic carboxy acid, or its obvious functional equivalent, such as phthalic anhydride, and an acylated tertiary methylene diamine. The diamine that is employed is of the kind characterized by the presence of at least one oxy-acyl radical derived from a detergent forming monocarboxy acid linked to an amino nitrogen atom by a hydrocarbon radical, or its obvious functional equivalent, such as a hydrocarbon radical, interrupted at least once by an oxygen atom; said acylated tertiary methylene diamine being additionally characterized by having at least one alcoholic hydroxyl radical.

As to comparable compositions of matter, in which the diamine does not contain as an integral part of the molecule, an oxy-acyl radical derived from a detergent-forming acid, but characterized by the fact that the polybasic acid is joined directly or through a suitable intermediate to a detergent-forming acid, reference is made to the co-pending application for patent, Serial No. 273,223, filed May 12, 1939, by Melvin De Groote and Bernhard Keiser, said co-pending application also contemplating the use of the therein described compositions of matter as demulsifiers for oil field emulsions.

It is well known that certain monocarboxy organic acids, containing approximately 8 carbon atoms or more, and not more than 32 carbon atoms, are characterized by the fact that they combine with alkalies to produce soap or soap-like materials. These detergent-forming acids include fatty acids, resin acids, petroleum (naphthenic) acids, etc. For sake of convenience, these acids will be indicated by the formula R.COOH.

It is also well known that diamines, and particularly those having pronounced basic properties, may be derived by various means, provided that the resultant diamine is characterized by the fact that the two amino nitrogen atoms are not attached to the same carbon atom. Such diamines, generally referred to as alkylene diamines, are well known and may be characterized by ethylene diamine. The present invention does not contemplate the use of diamines of this type. Derivatives of the diamines herein contemplated are characterized by being a methylene diamine derivative, i. e., a derivative of the hypothetical methylene diamine

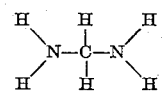

Methylene diamine is almost unknown for practical purposes, since it is very unstable in the form of a free base, but does exist in the form of alkylated or acylated derivatives. In view of this fact, it becomes obvious that the new chemical compound or composition of matter previously referred to must necessarily be obtained indirectly, insofar that the parent diamine is almost non-existent.

It is well known that a large number of secondary amines are available which may be designated by the formula type

in which B' represents an alkyl, aralkyl, alicyclic, aryl, alkylol, aralkylol, hydroxy alicyclic, heterocyclic, or other equivalent radical; and B'' an alkylol, aralkylol, hydroxy alicyclic, or similar radical. Similarly, the formula

represents a secondary amine, in which a hydroxy hydrocarbon radical may or may not be present as a substituent for an amino hydrogen atom.

It is well known that aldehydes, particularly the aldehydes of relatively low molecular weight, such as formaldehyde, acetaldehyde, aldol, furfural, benzaldehyde, phenylacetaldehyde, hexahydro-benzaldehyde, etc., can combine with two moles of a secondary amine, so as to yield a methylene diamine, characterized by the fact that the two amino nitrogen atoms are attached to the same carbon atom. Such reaction may be indicated in the following manner:

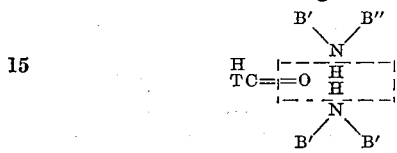

The amine so produced may be indicated by the following formula:

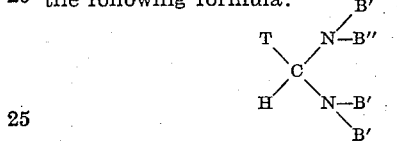

in which T may represent a hydrogen atom derived from formaldehyde, or may represent a radical derived from acetaldehyde, propionaldehyde, butyraldehyde, heptaldehyde, lauric aldehyde, palmitic aldehyde, or stearic aldehyde, etc. Naturally, B" may occur more than once, and B' less than three times. Similarly, instead of aliphatic aldehydes, one may employ heterocyclic aldehydes, such as furfuraldehyde, or aromatic aldehydes, such as benzaldehyde, or an aralkyl aldehyde, such as phenylacetaldehyde. One may also employ alicyclic aldehydes, such as hexahydro-benzaldehyde. Unsaturated aldehydes, such as acrolein, crotonaldehyde, or tiglic aldehyde, may be employed. As previously indicated, B' may represent radicals, such as methyl, ethyl, propyl, butyl, amyl, hexyl, octyl, decyl, hexadecyl, octadecyl, or similar radicals. Similarly, B' may represent an alkyl radical, such as a benzyl radical, ethyl benzyl radical, dimethyl benzyl radical, an alicyclic radical, such as the cyclohexyl, methyl cyclohexyl, etc.; likewise, B', as well as B'', may represent the radicals hydroxy ethyl, hydroxy propyl, hydroxy butyl, and other similar radicals, including a $C_6H_4C_2H_4OH$ radical, or, a $C_6H_{10}OH$ radical. Other radicals include the furfural radical, or hydroxy derivatives thereof. Piperidine may be considered as a special adaptation, in which one radical replaces two amino hydrogen atoms. As previously indicated, B' may be selected from any of the type of radicals above mentioned; whereas, B" is limited to those radicals in which there is an alcoholic hydroxy group present, such as an alkylol radical, etc.

It is to be noted that the methylene diamine, expressed by the above formula, is a tertiary diamine in the sense that neither amino nitrogen atom has attached thereto a replaceable hydrogen atom. For convenience, the above formula may be rewritten as follows, so as to indicate that there is present an alcoholic hydroxyl radical:

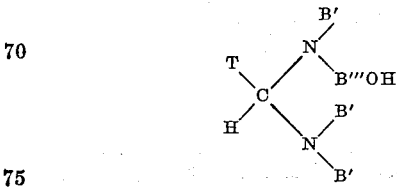

in which B''' OH is obviously the monovalent hydroxy hydrocarbon radical, such as an alkylol radical or the like. It is well known that amines, particularly non-aryl, such as triethanolamine or the like, can be acylated by reaction with fatty acids, or a suitable functional derivative thereof, such as the acyl chloride, or the anhydride, or even the ester. If the tertiary hydroxy methylene diamine of the kind just described is reacted with a detergent-forming monobasic carboxy acid, the reaction may be indicated in the following manner:

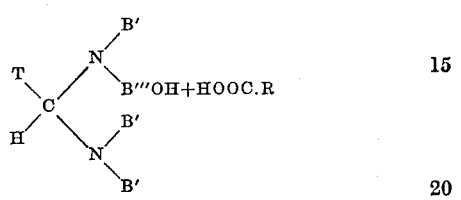

with the formation of an intermediate ester, which may be indicated in the following manner:

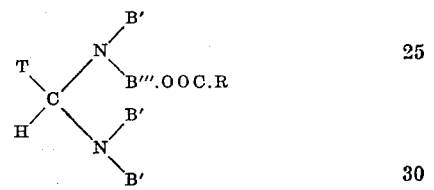

Such intermediate ester can only react with polybasic acids, such as phthalic anhydride, provided that there is present at least one alcoholic hydroxyl radical. In order to indicate the various forms of such hydroxylated intermediate ester, attention is directed to the following facts: the hydroxyl radical may be present as part of the radical derived from the detergent-forming monobasic carboxy acid; for instance, if ricinoleic acid, diricinoleic acid, hydroxy-stearic acid, dihydroxy stearic acid, chlorinoted ricinoleic acid, or the like had been employed, then there would be present an alcoholic hydroxyl radical, and the above formula might be rewritten as follows:

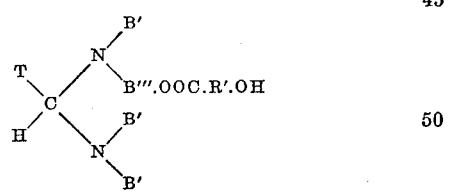

Similarly, there might be present, prior to reaction with the detergent-forming monocarboxy acid or its equivalent, more than one hydroxy hydrocarbon radical. For instance, the composition might be indicated thus:

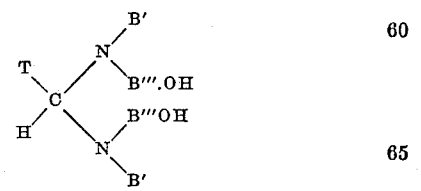

or

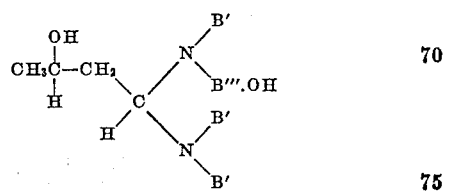

An examination of the previous formulas reveals that the hydroxylated tertiary acylated methylene diamine must contain at least one hydroxyl, and might contain as many as nine hydroxyls available for esterification; and as a matter of fact, might contain an even greater number if, instead of using the secondary amine, such as diethanolamine, dipropanolamine, dibutanolamine, etc., one employed ethanolglycerylamine, propyl glycerylamine, or diglycerylamine. Amines derived from diglycerol instead of glycerol would furnish radicals containing three hydroxyls, even after attachment to the amino nitrogen atom. Similarly, the detergent-forming monocarboxy acid radical might be derived from hydroxystearic acid, and thus furnish as many as eight alcoholic hydroxyl radicals. If, in all instances, B' and B''' are derived from diglycerylamine, there would be present at least sixteen hydroxyls, and there might be present at least one more, if aldol or a higher homologue were employed as a reactant in formation of the intermediate ester.

In addition to aldol, other similar hydroxy aldehydes or aldehyde-alcohols may be employed. As to such aldehydes other than aldol, reference is made to Richter's Organic Chemistry, (Allott), volume 1, third English edition, 1934, pages 389–391.

In view of what has been said previously, it does not appear necessary to enumerate various suitable amines which may be employed, but it may be well to indicate that among those which may be employed are the following: diethanolamine, dipropanolamine, dibutanolamine, dioctanolamine, dipentanolamine, glyceryl hexanolamine, methyl glycerylamine, ethyl glycerylamine, propyl glycerylamine, cyclohexyl glycerylamine, benzyl glycerylamine; dibenzylamine, ethyl benzylamine, methyl benzylamine, propyl benzylamine, phenylmonoethanolamine, naphthylmonoethanolamine, cyclohexyl ethylamine, cyclohexyl propylamine, cyclohexyl hexylamine, diethylamine, dipropylamine, diamylamine, dihexylamine, dioctylamine, diglycerylamine, etc. In all the previous examples each radical indicates a substituent for an amino hydrogen atom. Similarly, amines can be obtained from polyglycerols or polyglycols, as for instance, the secondary amines, indicated by the following formulas:

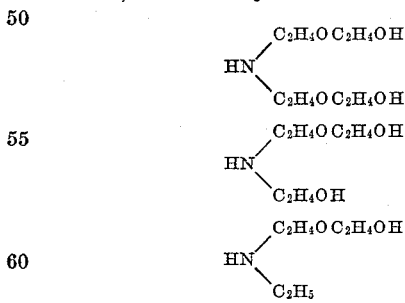

Such amines may serve as functional equivalents of the previously described amines, which happen to be free from an ether linkage. Likewise, one may have amines in which there is more than one ether linkage, i. e., in which the hydrocarbon radical which replaces an amino hydrogen atom has been interrupted more than once by an oxygen atom.

In examining the previous formulas, it becomes evident that if two different amines are employed, one of which does not contain a hydroxylated hydrocarbon radical, then the reaction is not limited to two dissimilar amines, but may take place in part in such a manner as to involve two similar amines, i. e., the aldehyde may react with two molecules of the hydroxylated amine; it may react with one mole of the hydroxylated amine and one mole of the non-hydroxylated amine; or it may unite with two moles of the non-hydroxylated amine. In such event as last mentioned, the resultant compound is without value, unless a hydroxy aldehyde, such as aldol, has been employed. In such event, an attempt to esterify with a detergent-monocarboxy acid results in the formation of an entirely different type of material, i. e., an acid radical being introduced into the aldehyde radical or residue as differentiated from the amine radical residue; and in fact, one must esterify with a hydroxylated fatty acid or its equivalent, that is, ricinoleic acid, if one intends to obtain a product which is subsequently susceptible to esterification with phthalic anhydride or the like, which is not objectionable, and is, in fact, of value for the various purposes herein enumerated, but is not contemplated within the hereto attached claims. For practical purposes, then, it is most expedient to manufacture or produce a methylene diamine from a single kind of secondary amine; and in such event, obviously it must be a hydroxylated amine, such as diethanolamine. In subsequent examples, diethanolamine is employed as the secondary amine for reaction with the aldehyde; but in view of what has been said previously, various other secondary amines or mixtures thereof might be employed.

Attention is again directed to the fact that wherever a hydroxyl radical exists, and provided it is not necessary for subsequent reaction, then such hydroxyl radical could be reacted with an acid, such as acetic acid, butyric acid, heptoic acid, etc.; and this statement applies to the hydroxyl radical of an alcohol aldehyde, such as aldol. Furthermore, an alkylol radical might be so combined as has been previously pointed out, or the alcohol radical or its equivalent might be combined with a monohydric alcohol. In essence, such combination simply results in the hydrocarbon chain interrupted at least once by an oxygen atom, as differentiated from an uninterrupted hydrocarbon chain. In the hereto appended claims reference to an alkyl alkylol or similar radical is intended specifically to include such examples where there is interruption of the chain or ring by an oxygen atom. All hydroxyl radicals present may be acylated except one, and if at least one of the acylating acids is a hydroxy acid, such as ricinoleic acid, then in that event, all hydroxyl radicals may be acylated.

The composition of matter herein contemplated is obtained, as has been previously pointed out, by reaction between amines of the kind described, and polybasic acids or their obvious equivalent, such as the anhydrides or acyl chlorides or the like; and included among the various polybasic acids which may be used are: phthalic, succinic, malic, fumaric, citric, maleic, adipic, tartaric, gluteric, diphenic, naphthalic, oxalic, chlorphthalic, nitrophthalic, etc., some of which have three carboxyl radicals.

Having obtained the hydroxylated tertiary acylated methylene diamine of the kind previously described in an anhydrous state, reaction with the polybasic carboxy acid takes place rapidly and is nothing more than an esterification reaction comparable in nature to reactions between phthalic anhydride and glycerol, or ethylene glycol, diethylene glycol, diglycerol, diethanolamine, triethanolamine, or the like, all of which are well known. The conditions of reaction are substantially the same as employed in the types of reaction just enumerated.

Our preferred reagent is obtained in the following manner:

We react a readily available aldehyde, such as acetaldehyde or heptaldehyde, in the molecular proportions of one mole of aldehyde with two moles of diethanolamine. Such reaction is conducted in the manner previously noted; and after completion of reaction, any water still present which has not been removed previously in the course of reaction is removed by distillation, preferably under vacuum.

Such hydroxylated diamine is then treated in the proportion of three moles of diamine to two moles of castor oil, which consists essentially of triricinolein. Any suitable quantity of material may be employed, for instance, 500 lbs. of the selected anhydrous diamine and the appropriate amount of castor oil. The two products are mixed together and heated at a reasonable temperature above the boiling point of water and below the point of decomposition, for instance, at some temperature between 135-175° C. for a suitable period of time, i. e., 1 to 5 hours. The product so obtained is the acylated diamine mixed with some free glycerol and certain other accompanying cogeneric products.

Our preference is to conduct the esterification reaction in the same apparatus as employed for the alcoholysis reaction just referred to. In other words, having prepared the acylated diamine, we add a suitable quantity of phthalic anhydride. Generally speaking, our preference is to employ an equal weight, or preferably an excess, such as 50% more phthalic anhydride by weight, than the equivalent quantity of diethanolamine employed in preparing the diamine. Naturally, the amount of phthalic anhydride is dependent, in part, on whether or not a hydroxylated fatty acid, such as ricinoleic, was used for acylation. The esterification reaction is conducted in the conventional manner until all free phthalic anhydride has disappeared. The product so obtained is suitable for use as a demulsifier for oil field emulsions.

The tertiary methylene diamine of the kind described may be considered, for the sake of simplicity, as being in the class of an alcohol, i. e., a monohydric or polyhydric alcohol. If an alcohol is indicated by the formula $Y'(OH)_n$, where $n$ indicates the number one or more, and if a polybasic acid be indicated by the formula $X'(COOH)_n$, where $n$ indicates the number 2 or more, then the reactions between a monohydric alcohol and a polybasic acid will result in a compound which may be indicated by the following formula: $YX(COOH)_{n'}$, where $n'$ indicates the number one or more, and which is, in reality, a contraction of a more elaborate structural formula, in which $X'$ and $Y'$ are joined by a carboxyl radical or residue. Assuming, however, as would be true in the majority of cases, that the alcohol actually would be a polyhydric alcohol, then examination reveals that the formula might result in a combination, in which there were neither residual carboxyl radicals, nor residual hydroxyl radicals, or might result in compounds in which there were residual hydroxyl radicals and no residual carboxyl radicals, or compounds where there might be residual carboxyl radicals and no residual hydroxyl radicals; or there might be both. This is indicated by the following:

$$(Y.X)_q(OH)_{n'}$$
$$(Y.X)_q(COOH)_{m'}$$
$$(OH)_{n''}(YX)_q(COOH)_{m''}$$

in which $q$ indicates a small whole number (one in the case of a monomer and probably not over 20 and usually less than 10), and $m'$ and $n'$ indicate the number one or more, and $m''$ and $n''$ indicate a small or moderately-sized whole number, such as 0, 1 or more, but in any event, probably a number not in excess of 40; for instance, as would be indicated by a molecule which involved 10 to 15, or perhaps 20 moles of methylene diamine derived from aldol and diglycerylamine. Naturally, each residual hydroxyl could be combined with phthalic anhydride, so as to give at least one free carboxyl; or if combined with a tribasic acid, such as citric acid, the number of free carboxyls might approach several hundred; for instance, 400 or 500 at least. Actually, the preferable type of reagent would be more apt to contain less than 20, and in fact, less than 10 free hydroxyl radicals. It is not necessary to remark that residual carboxyl radicals can be permitted to remain as such, or can be neutralized in any suitable manner, such as conversion into salts, esters, amides, amino esters, or any other suitable form. Usually, such conversion into salt form would be by means of sodium hydroxide, potassium hydroxide, calcium hydroxide, magnesium hydroxide, ammonium hydroxide, amylamine, butanolamine, ethanolamine, diethanolamine, triethanolamine, cyclohexanolamine, benzylamine, aniline, toluidine, etc. Conversion into the ester would be by means of a monohydric alcohol, such as methyl alcohol, ethyl alcohol, propyl alcohol, butyl alcohol, hexyl alcohol, octyl alcohol, decyl alcohol, ethylene glycol, diethylene glycol, glycerol, diglycerol, triethylene glycol, or the like, or one might employ a hydroxylated fatty acid, such as ricinoleic acid, or its ester, such as ethyl ricinoleate or triricinolein as an alcohol, i. e., in such a manner that reaction would involve the alcohol hydroxyl radical. Naturally, if desired, the polybasic acid, such as citric or phthalic anhydride, may be reacted with a selected body, so as to form a fractional ester, and such fractional ester may be employed, instead of the acid, followed by subsequent esterification. Thus, one may employ triricinolein monophthalate, or the di-phthalate, ricinoleic acid monophthalate, ethyl hydroxystearate monophthalate, di-stearin monophthalate, di-naphthenin monophthalate, di-abietin monophthalate, etc.

If a tricarboxy acid, such as citric acid, is employed, then at least theoretically, three moles of the tertiary methylene diamine might react with one mole of citric acid. Similarly, as has already been pointed out, at least seventeen moles of a polybasic acid might be combined with a highly hydroxylated methylene amine. For practical purposes, however, we have found that the most desirable products are obtained by combinations, in which the ratio of the alcoholic diamine to the polybasic acid is within the ratio of three to one and one to five, and in which the molecular weight of the resultant product does not exceed 10,000, and is usually less than 5,000, or perhaps less than 3,000. This is particularly true if the resultant product is soluble to a fairly definite extent, for instance, at least 5% in some solvent, such as water, alcohol, benzene, dichlorethyl ether, acetone, cresylic acid, or the like. This is simply another way of stating that it is preferable that the product be of the sub-resinous type, which is commonly referred to as an A resin or a B resin, as distinguished from a C resin, which is a highly infusible, insoluble resin (see Ellis, Chemistry of Synthetic Resins (1935), pages 862, et seq.).

In recapitulating what has been said previously, the sub-resinous, semi-resinous, or resinous product herein contemplated may be indicated by the following formula:

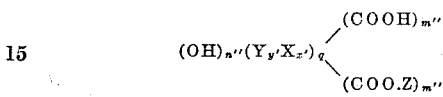

in which the characters have their previous significance, and $y'$ represents a small whole number not greater than 3, and $x'$ represents a small whole number not greater than 5; Z represents a hydrogen ion equivalent, such as a metallic atom, organic radical, etc.

One must not lose sight of the fact that the product herein contemplated is a basic amine. This means, of course, that the product can combine with acids to form salts; for instance, it may combine with acetic acid, hydrochloric acid, oxalic acid, phthalic acid, butyric acid, naphthenic acid, etc. To state the matter another way, the herein contemplated amine, if desired, may be dissolved in a dilute acid, such as 5% of acetic acid, 5% sulfuric acid, 5% nitric acid, or the like. The amine may be used as such, or as an aqueous solution, which in essence, represents the corresponding diammonium base. In other words, all references herein to the final product, and particularly in the appended claims, contemplate not only the amine itself, but the corresponding salts or double salts, the corresponding base or double base, the corresponding salt base mixture, or similar variations, which may be indicated from this viewpoint solely by the following monomeric type formulas:

All that has been said previously can be recast in a single formula, in view of the following consideration: The aldehyde employed may be indicated by the following formula:

in which T' represents a hydrogen atom or Z'T. In the last mentioned situation, T represents a divalent hydrocarbon radical, and Z' represents a hydrogen atom, a hydroxyl radical, an R.COO radical, i. e., an oxy-acyl radical derived from a detergent-forming monocarboxy acid, an OH.R'COO radical, i. e., a special type of detergent-forming monocarboxy acid, to wit, a hydroxylated one, such as ricinoleic acid, hydroxynaphthenic acid, hydroxy abietic acid, or the like; or it may represent R''COO, an oxy-acyl radical derived from a monobasic carboxy acid having 7 carbon atoms or less, such as heptoic acid, acetic acid, etc. Such aldehyde combines with two moles of an acylated amine, or with two moles of an amine, which may be subsequently acylated with a detergent-forming acid to give an intermediate amine, which may be indicated by the following formula:

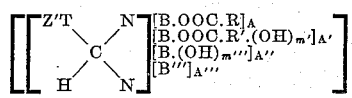

in which all the characters have their previous significance, B being a divalent hydrocarbon radical, which may be interrupted at least once by an oxygen atom, $m'$ representing the number 1 or 2, $m'''$ representing the number 1, 2 or 3, and B''' representing a monovalent hydrocarbon radical, which may be interrupted at least once by oxygen. A, A', A'' and A''' represent the numbers 0, 1, 2, 3 or 4, with the proviso that $A+A'+A''+A'''$ shall equal 4; and there must be present at least one alcoholic hydroxyl radical.

For the sake of simplicity, it is pointed out once more that Z'T collectively may represent a hydrogen atom, instead of a methyl radical, for instance, and that it is contemplated that in the hereto attached claims formaldehyde, having only the hydrogen atom attached to the carbon atom, shall be considered as the obvious functional equivalent of acetaldehyde, etc. It has been previously pointed out that an effort to recognize this minor differentiation in the structural formula produces a further step or complication in nomenclature.

The final composition of matter herein contemplated may be characterized for the sake of simplicity in the following manner, and it is to be noted that certain subletters are hereafter changed for purposes of simplification:

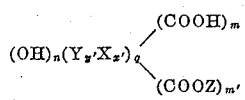

in which $y'$ represents a small whole number not greater than 3, and $x'$ represents a small whole number not greater than 5, and $n$, $m$, and $m'$ indicate small whole numbers such as 0, 1, or more, but in any event, probably a number not in excess of 40, and more likely not over 20; $q$ indicates a small whole number probably not over 20, and usually less than 10; Z is a hydrogen ion equivalent; Y is a residue or radical derived from a hydroxylated acylated tertiary diamine of the type:

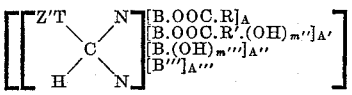

in which all of the characters have their previous significance, to wit, B being a divalent hydrocarbon radical, which may be interrupted at least once by an oxygen atom, and may have a hydroxyl radical as an integral part thereof, $m''$ representing the number 1 or 2, $m'''$ representing the number 1, 2 or 3, and $B'''$ representing a monovalent hydrocarbon radical, which may be interrupted at least once by oxygen; A, A', A'' and A''' represent the numbers 0, 1, 2, 3 or 4, with the proviso that $A+A'+A''+A'''$ shall equal 4; and there must be present at least one alcoholic hydroxyl radical as a part of the diamine; Z'T collectively may represent a hydrogen atom, instead of a methyl radical, for example; and X is a residue or radical derived from a polybasic carboxy acid.

When aldehydes and secondary amines react, in addition to the tertiary methylene diamine, there may be formed minor by-products, such as polymeric forms and the like. Similarly, it is possible that other by-products or cogeneric compounds are formed in the subsequent reactions previously described. As far as demulsification of crude oils or similar purposes are concerned, it is quite probable that the presence of such cogeneric materials is not objectionable, but may be desirable. Therefore, in order to define completely the metes and bounds of the present invention, it is deemed advisable to characterize the final product not only by means of the formula above described, but also in terms of the steps of manufacture. It is obvious that certain alternate forms of the steps of manufacture may be employed, but they would be the obvious equivalents of the steps indicated. For instance, the polybasic carboxy acid, such as phthalic acid, might be combined with ricinoleic acid, and such material employed for acylation of the tertiary methylene diamine. However, such obvious variation is the equivalent of the steps or procedure herein indicated. One might acylate a secondary alkylol amine, such as diethanolamine, and employ such compound for reaction with the selected aldehyde.

It is believed that the principal product of reaction previously described is obtained through the formation of an intermediate commonly referred to as a pseudo-basic carbinal. See Journal of the Chemical Society, volume 119, 1921, page 1470, and also volume 123, 1923, page 532. The formation of the intermediate may be indicated thus:

$$DH + O=\underset{H}{\overset{H}{C}} \longrightarrow HO-\underset{H}{\overset{H}{C}}-D$$

where DH is a molecule having a labile hydrogen atom. Such products are pseudo-carbinols, and in the event that D is connected to the carbon atom by means of a nitrogen atom, for instance, where D was derived from diethanolamine, then the previous formula becomes:

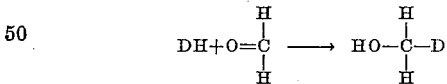

and compounds which carry the linkage

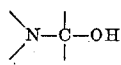

are commonly referred to as pseudo-basic carbinols.

One recognized property of the pseudo-basic carbinols is the avidity of the hydroxyl radical for a labile hydrogen atom. Thus, the above intermediate would immediately react with a second molecule of diethanolamine to form the diamine previously described. This is indicated in the following manner:

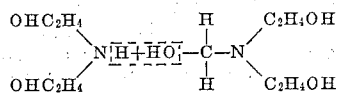

Such being the probable course of reaction, it is obvious that considerable insight is disclosed as to the nature of the accompanying cogeneric materials which are present in the mixture. In other words, one would expect to find material in which the hydrogen atom was removed from other sources, as, for instance, a hydrogen of the hydroxyl of an ethanol radical, etc.

In our divisional application Serial No. 300,842 filed Oct. 23, 1939, we have described a novel process for resolving or breaking petroleum emulsions of the water-in-oil type. Said process involves subjecting the emulsion to the action of a demulsifier consisting of the above described new material or composition of matter. Said material is used either alone, or in admixture with another, or with other conventional demulsifying agents; and its method of use is the same as that generally employed in resolving or breaking petroleum emulsions of the water-in-oil type with a chemical demulsifier. Briefly stated, the conventional method of using a chemical demulsifier to break a petroleum emulsion consists in introducing the demulsifier into the well in which the emulsion is produced; introducing the demulsifier into a conduit through which the emulsion is flowing; or introducing the demulsifier into a tank in which the emulsion is stored. After treatment the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. The amount of demulsifier that may be required to break the emulsion may vary from 1 part of demulsifier to 500 parts of emulsion, up to 1 part of demulsifier to 20,000 or even 30,000 parts of emulsion.

We desire to point out that the superiority of the reagent or demulsifying agent herein described is based upon its ability to treat certain emulsions more advantageously and at a somewhat lower cost than is possible with other available demulsifiers, or conventional mixtures thereof. It is believed said demulsifying agent or treating agent will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

Having thus described our invention, what we claim as new and desire to secure by Letters Patent is:

1. An esterification reaction product of: (A) a polybasic carboxy acid; and (B) a hydroxylated diamine derived by reaction between: first, a secondary amine; and second, an aldehyde, followed by subsequently subjecting said amine aldehyde reaction product to an acylation reaction involving an acid compound derived from a detergent-forming acid having not less than 8 carbon atoms and not more than 32 carbon atoms.

2. An esterification reaction product of: (A) a polybasic carboxy acid; and (B) a hydroxylated diamine derived by reaction between: first, a secondary amine free from aryl radicals; and second, an aldehyde, followed by subsequently subjecting said amine aldehyde reaction product to an acylation reaction involving an acid compound derived from a detergent-forming acid having not less than 8 carbon atoms and not more than 32 carbon atoms.

3. A method of making a new composition of matter, characterized by reacting under conditions such as to cause esterification: (A) a polybasic carboxy acid; and (B) a hydroxylated diamine derived by reaction between: first, a secondary amine; and second, an aldehyde, and said amine aldehyde reaction product being subsequently subjected to an acylation reaction involving an acid compound derived from a detergent-forming acid having not less than 8 carbon atoms and not more than 32 carbon atoms.

4. A method of making a new composition of matter, characterized by reacting under conditions such as to cause: (A) a polybasic carboxy acid; and (B) a hydroxylated diamine derived by reaction between: first, a secondary amine free from aryl radicals; and second, an aldehyde, and said amine aldehyde reaction product being subsequently subjected to an acylation reaction involving an acid compound derived from a detergent-forming acid having not less than 8 carbon atoms and not more than 32 carbon atoms.

5. A sub-resinous composition of matter, comprising an esterification reaction product of the formula type:

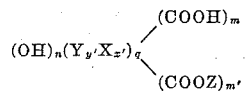

in which X is a radical derived from a polybasic carboxy acid and $y'$ represents a small whole number not greater than 3, and $x'$ represents a small whole number not greater than 5, and $n$, $m$, and $m'$ indicate small whole numbers such as 0, 1, or more, but in any event a number not in excess of 40; $q$ indicates a small whole number not over 20; Z is a hydrogen ion equivalent; Y is a radical derived from a hydroxylated acylated tertiary methylene diamine obtained by reaction between: first, a secondary amine; and second, an aldehyde, followed by subsequently subjecting said amine aldehyde reaction product to an acylated reaction involving an acid compound derived from a detergent-forming acid having not less than 8 carbon atoms and not more than 32 carbon atoms.

6. A sub-resinous composition of matter, comprising an esterification reaction product of the formula type:

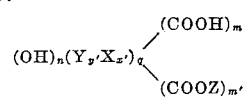

in which X is a radical derived from a polybasic carboxy acid and $y'$ represents a small whole number not greater than 3, and $x'$ represents a small whole number not greater than 5, and $n$, $m$, and $m'$ indicate small whole numbers such as 0, 1, or more, but in any event a number not in excess of 40; $q$ indicates a small whole number not over 20; Z is a hydrogen ion equivalent; Y is a radical derived from a hydroxylated acylated tertiary methylene diamine obtained by reaction between: first, a secondary amine free from aryl radicals; and second, an aldehyde, followed by subsequently subjecting said amine reaction product to an acylation reaction involving an acid compound derived from a detergent-forming acid having not less than 8 carbon atoms and not more than 32 carbon atoms.

7. A sub-resinous composition of matter, comprising an esterification reaction product of the formula type:

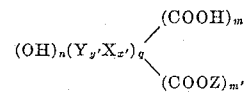

in which X is a radical derived from a polybasic carboxy acid and $y'$ represents a small whole number not greater than 3, and $x'$ represents a small whole number not greater than 5, and $n$, $m$, and $m'$ indicate small whole numbers such as 0, 1, or more, but in any event a number not in excess of 40; $q$ indicates a small whole number not over 20; Z is a hydrogen ion equivalent; Y is a radical derived from a hydroxylated acylated tertiary methylene diamine obtained by reaction between: first, a secondary alkylolamine free from aryl radicals; and second, an aldehyde, followed by subsequently subjecting said amine reaction product to an acylation reaction involving an acid compound derived from a detergent-forming acid having not less than 8 carbon atoms and not more than 32 carbon atoms.

8. A sub-resinous composition of matter, comprising an esterification reaction product of the formula type:

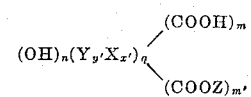

in which X is a radical derived from a polybasic carboxy acid and $y'$ represents a small whole number not greater than 3, and $x'$ represents a small whole number not greater than 5, and $n$, $m$, and $m'$ indicate small whole numbers such as 0, 1, or more, but in any event a number not in excess of 40; $q$ indicates a small whole number not over 20; Z is a hydrogen ion equivalent; Y is a radical derived from hydroxylated acylated tertiary methylene diamine obtained by reaction between: first, diethanolamine and second, an aldehyde, followed by subsequently subjecting said amine reaction product to an acylation reaction involving an acid compound derived from a detergent-forming acid having not less than 8 carbon atoms and not more than 32 carbon atoms.

9. A sub-resinous composition of matter, comprising an esterification reaction product of the formula type:

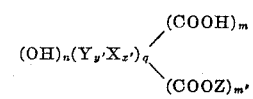

in which X is a radical derived from a polybasic carboxy acid and $y'$ represents a small whole number not greater than 3, and $x'$ represents a small whole number not greater than 5, and $n$, $m$, and $m'$ indicate small whole numbers such as 0, 1, or more, but in any event a number not in excess of 40; $q$ indicates a small whole number not over 20; Z is a hydrogen ion equivalent; Y is a radical derived from hydroxylated acylated tertiary methylene diamine obtained by reaction between: first, diethanolamine; second, an aldehyde, followed by subsequently subjecting said amine reaction product to an acylation reaction involving an acid compound derived from a fatty acid.

10. A sub-resinous composition of matter, comprising an esterified reaction product of the formula type:

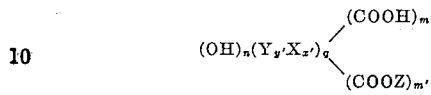

in which X is a radical derived from a polybasic carboxy acid and $y'$ represents a small whole number not greater than 3, and $x'$ represents a small whole number not greater than 5, and $n$, $m$, and $m'$ indicate small whole numbers such as 0, 1, or more, but in any event a number not in excess of 40; $q$ indicates a small whole number not over 20; Z is a hydrogen ion equivalent; Y is a radical derived from hydroxylated acylated tertiary methylene diamine obtained by reaction between: first, diethanolamine; second, an aldehyde, followed by subsequently subjecting said amine reaction product to an acylation reaction involving an acid compound derived from an unsaturated fatty acid.

11. A sub-resinous composition of matter, comprising an esterification reaction product of the formula type:

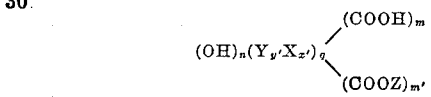

in which X is a radical derived from a polybasic carboxylic acid and $y'$ represents a small whole number not greater than 3, and $x'$ represents a small whole number not greater than 5, and $n$, $m$, and $m'$ indicate small whole numbers such as 0, 1, or more, but in any event a number not in excess of 40; $q$ indicates a small whole number not over 20; Z is a hydrogen ion equivalent; Y is a radical derived from hydroxylated acylated tertiary methylene diamine obtained by reaction between: first, diethanolamine; second, an aldehyde, followed by subsequently subjecting said amine reaction product to an acylation reaction involving an acid compound derived from a hydroxylated unsaturated fatty acid.

12. A sub-resinous composition of matter, comprising an esterification reaction product of the formula type:

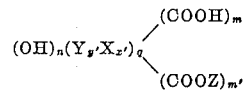

in which X is a radical derived from a polybasic carboxylic acid and $y'$ represents a small whole number not greater than 3, and $x'$ represents a small whole number not greater than 5, and $n$, $m$, and $m'$ indicate small whole numbers such as 0, 1, or more, but in any event a number not in excess of 40; $q$ indicates a small whole number not over 20; Z is a hydrogen ion equivalent; Y is a radical derived from hydroxylated acylated tertiary methylene diamine obtained by reaction between: first, diethanolamine; second, an aldehyde, free from an alkyl radical containing more than 2 carbon atoms.

13. A sub-resinous composition of matter, comprising an esterification reaction product of the formula type:

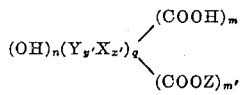

in which X is a radical derived from a polybasic carboxylic acid and $y'$ represents a small whole number not greater than 3, and $x'$ represents a small whole number not greater than 5, and $n$, $m$, and $m'$ indicate small whole numbers such as 0, 1, or more, but in any event a number not in excess of 40; $q$ indicates a small whole number not over 20; Z is a hydrogen ion equivalent; Y is a radical diamine obtained by reaction between: first, diethanolamine; second, acetaldehyde, followed by subsequently subjecting said amine aldehyde reaction product to acylation reaction involving ricinoleic acid.

MELVIN DE GROOTE.
BERNHARD KEISER.
ARTHUR F. WIRTEL.